H. W. DUNBAR, A. TURNER AND G. H. SMITH.
CAM GRINDING APPARATUS.
APPLICATION FILED JULY 15, 1918.

1,339,746.

Patented May 11, 1920.
5 SHEETS—SHEET 1.

Witnesses
H. Hamill
L. F. Butterfield

INVENTORS
H. W. DUNBAR, A. TURNER
and G. H. SMITH
BY
Clayton L. Jenks
ATTORNEY

H. W. DUNBAR, A. TURNER AND G. H. SMITH.
CAM GRINDING APPARATUS.
APPLICATION FILED JULY 15, 1918.

1,339,746.

Patented May 11, 1920.
5 SHEETS—SHEET 2.

Witnesses.
JH. Hamill
L. F. Butterfield

INVENTORS
H.W.DUNBAR, A.TURNER
and G.H.SMITH
BY
Clayton L. Jenks
ATTORNEY

INVENTORS
H. W. Dunbar, A. Turner
and G. H. Smith.

H. W. DUNBAR, A. TURNER AND G. H. SMITH.
CAM GRINDING APPARATUS.
APPLICATION FILED JULY 15, 1918.
1,339,746.
Patented May 11, 1920.
5 SHEETS—SHEET 5.
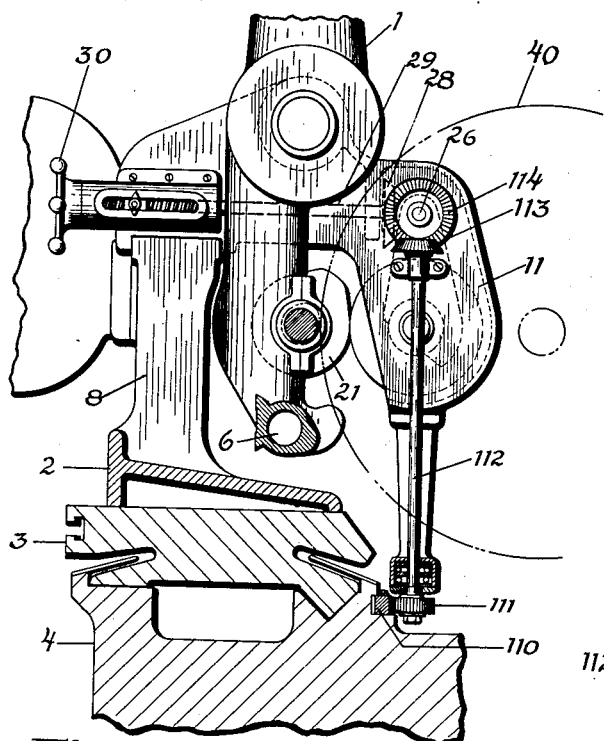
Fig.10.
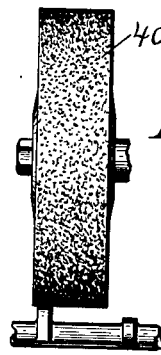
Fig.12.
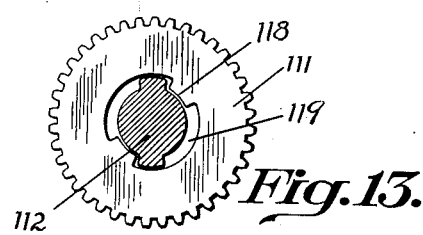
Fig.13.
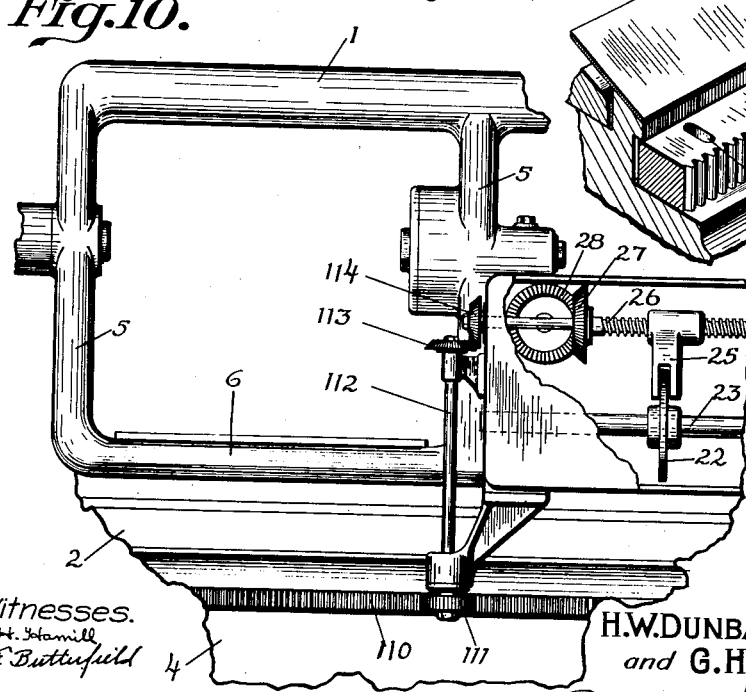
Fig.14.
Fig.11.
Witnesses.
H. Hamill
L. F. Butterfield
INVENTORS
H.W.DUNBAR, A.TURNER
and G.H.SMITH
BY
Clayton L. Jenks
ATTORNEY

UNITED STATES PATENT OFFICE.

HOWARD W. DUNBAR, ALBERT TURNER, AND GEORGE H. SMITH, OF WORCESTER, MASSACHUSETTS, ASSIGNORS, BY MESNE ASSIGNMENTS, TO NORTON COMPANY, OF WORCESTER, MASSACHUSETTS, A CORPORATION OF MASSACHUSETTS.

CAM-GRINDING APPARATUS.

1,339,746.   Specification of Letters Patent.   Patented May 11, 1920.

Application filed July 15, 1918. Serial No. 245,053.

*To all whom it may concern:*

Be it known that we, HOWARD W. DUNBAR, ALBERT TURNER, and GEORGE H. SMITH, citizens of the United States of America, residing at Worcester, in the county of Worcester and State of Massachusetts, have invented certain new and useful Improvements in Cam-Grinding Apparatus, of which the following is a full, clear, and exact specification.

There have been certain serious defects in cam-grinding apparatus previously manufactured, involving a swinging frame supporting the cam shaft to be ground, which is rocked by means of master cams on the frame rotated against a fixed shoe. The driving connection for the work-holder and the master cam spindle has comprised gears rolling upon each other, one gear being axially alined with the pivots of the frame. In such a construction, when the frame is rocked in the same direction in which the gear wheels are moving, there is a retardation of the motion of the spindle varying with the difference in speed of gear motion and the frame motion until they are both moving at the same speed, resulting in complete stoppage of the rotation of the work and spindle; and when the frame is rocked in the opposite direction the spindle movement is accelerated accordingly, thereby causing such changes in the surface speed of the grinding operation as to introduce various associated errors, resulting in recognized defects in the grinding, such as lines parallel to the axis of rotation of the work, commonly known as chatter marks, excessive removal of metal on the nose or tip of the cam to give the appearance of scallops, or the incomplete grinding of the face of the cam.

It is accordingly an object of our invention to provide a cam-grinding attachment of the class specified in which the driving mechanism is so designed that the rotation of the cam spindle is continuous and there is no detrimental grinding effect resulting from a variation in the work speed due to swinging movement of the frame.

Another object is to connect the swinging work and the master cam shaft with a power-driven shaft, which is located in a fixed position apart from the swinging frame, by means of a driving mechanism which permits movement of the frame and yet transmits a continuous motion to the work.

A further object is to provide, in a cam-grinding attachment of the character specified, means for automatically adjusting the relative positions of the master cams and the shoe to correspond with the position of the cam shaft being ground relative to the grinding wheel, so that it is merely necessary for the operator to move the work table and place a new cam in position for grinding, without giving attention to the master cams, and the shoe will be found in correct position in front of the proper master.

A still further object is to provide means permitting the operator to traverse the work across the grinding wheel during grinding without affecting the positions of the master cams and yet permit of an automatic adjustment of the masters by moving the work to a new position.

With these and further objects in view, as will be apparent from the following disclosure, our invention resides in the combination of parts set forth in the specification and covered by the claims annexed thereto.

In the drawings, in which like reference numerals indicate like parts:

Fig. 5 is a perspective detail of the guide yoke and master cam roller;

Fig. 6 is a perspective detail view of the brake band shown in Fig. 1;

Fig. 7 is a detail elevation, partly in section, of the adjusting means and indicator for determining the position of the master cam roller;

Fig. 10 is a view similar to Fig. 3 showing a modified form of cam roller adjustment mechanism in which the cam roller is automatically moved to correspond with the movement of the table;

Fig. 11 is a detail, similar to Fig. 2, showing the modification of Fig. 10;

Fig. 12 is a detail in elevation of the grinding wheel and cam shaft;

Fig. 13 is a view of the clutch pinion which engages the rack on the grinding machine base, permitting relative movement of the wheel across the cam during grinding, without affecting the position of the master cam roller; and Fig. 14 is a detail in perspective of a portion of the rack bar fastened to the grinding machine base, illustrating the adjustability of said bar.

Figure 1:
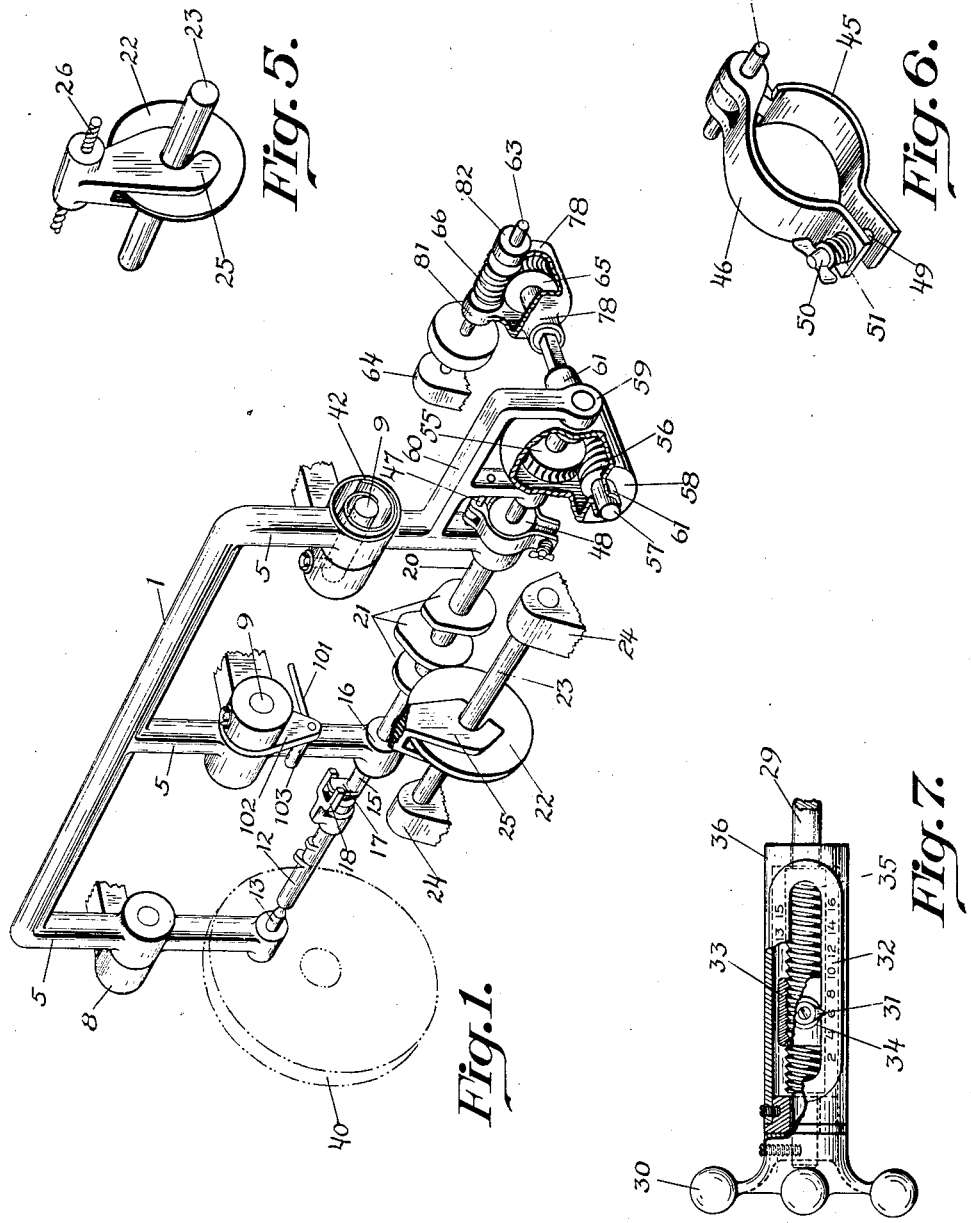
Figure 1 is a diagrammatic, perspective view showing the essential features of our invention.

As a specific embodiment of one phase of our invention, we have illustrated a construction involving, in general, a swinging frame 1 pivotally mounted upon the swivel table 2, carried by the sliding table 3 of a grinding machine base 4. The swinging frame is a rigid structure comprising three vertical standards 5 connected by top and bottom cross-pieces 6, these standards being relatively long so that the work may swing through a very flat arc. It is mounted upon pivots, supported by the table. One pivot comprising a pin 7 is fixed to the end arm 8, projecting upwardly from the swivel table, while the other two comprise pins 9, mounted in bearings 10 carried by other upright arms 8. A casing 11 is also supported by the two uprights 8 which carry pins 9 and is integral with bearings 10, this casing serving to hold the master cams, presently to be described.

The work to be ground, consisting in the present instance of a cam shaft 12, is supported by suitable means on the lower portion of the frame, this support comprising, for example, a center 13 mounted in the foot-stock 14 and adapted to be adjusted longitudinally for centering and removing the work. The other end of the cam shaft is similarly supported on a centering spindle 15 which is rotatably mounted in bearings in the central standard of the swinging frame. The cam shaft may be rotatably driven by suitable mechanism such as a lug 17 on the spindle 15 engaging with a driving dog 18 fixed to the cam shaft as by means of a set screw.

Axially alined with the cam shaft to be ground is a master cam spindle 20 which may be integral with or operatively connected with spindle 15 to rotate it. Master cams 21 are removably mounted on this shaft 20 and adapted to be rotated against a shoe rigidly held on a fixed part of the apparatus.

Owing to the fact that cams must be ground with extreme accuracy, we provide against variations appearing in the grinding results due to wear of the shoe by the constantly rotating cam. This is accomplished by substituting for the ordinary fixed shoe found in this type of machine a rotating shoe 22 which may slowly rotate under the frictional drive of the cam and thus present a constantly changing surface which is so large that it cannot become worn to an appreciable extent during a long period of grinding. Furthermore, when the device is used for grinding master cams, then a grinding wheel of the same size as the roller is substituted therefor, while a roller of the diameter of the former grinding wheel replaces it, thereby insuring extreme accuracy in making masters and cams.

In order that the master cam roller 22 may be adjustable to a position opposite any of the cams, we mount it loosely on a shaft 23 supported in suitable bearings 24 (only one shown in Fig. 2) in the end walls of casing 11. The roller 22 is adjusted lengthwise of its supporting shaft 23 by means of a guide yoke 25 which straddles the cam roller. The guide 25 may be moved longitudinally by means of the screw 26 coöperating with screw threads in guide 25. The screw 26 may be mounted in suitable bearings in casing 11 and rotated by means of bevel gear 27 thereon coöperating with a similar gear 28 on the shaft 29 mounted in the casing 11 and frame-work of the machine. (See Fig. 3.)

The shaft 29 is manually rotated by means of a hand wheel 30 conveniently located on front of the machine, adjacent the position taken by the grinding operator. By this means the master cam roller may be moved to a position in front of any one of the master cams, the position of the roller being ascertained, as shown in Fig. 7, by an indicating device 31 traveling along a scale 32. The pointer is carried by a screw-threaded block 33 on the threaded end of the shaft 29. This block is prevented from rotating by means of a projecting lug 34 which carries the pointer and engages the side walls of a slot 35 in the side of the casing 36, whereby rotative movement of the shaft 29 moves the block 33 and its pointer 31 longitudinally of the scale.

It is accordingly seen that when the shaft 20 is rotated the cam shaft 12 is synchronously rotated therewith by means of the lug on the spindle 15 and the cam shaft may be ground as by means of a grinding wheel 40, diagrammatically illustrated in the drawing. Since the master cams 21 are fixed rigidly on their supporting shaft 20 and rotate in engagement with the master cam roller 22, which is immovable radially, it follows that when the higher portion of the master cam approaches the cam roller the lower part of the swinging frame 1 is forced to retreat and move the cam shaft axis away from the grinding wheel. A corresponding forward motion of the cam shaft occurs when the roller rides down the opposite side of the master, whereby the wheel is prevented from grinding a true cylindrical shape and consequently forms the desired cam.

In order that the frame may swing uniformly and permit the master cam to hug the roller without jumping as a high point is passed, we utilize any well known construction such as a weight and pulley or a spring. In the present embodiment, we employ two spiral springs 42 suitably fastened at their exterior portions 43 to the uprights 5 which support the master cam spindle and at their inner ends to the spindles 9 which are adjustably fixed to the frame by means of set screws 44. These springs are so positioned as to neutralize the stress of the shoe against the master cam tending to distort the frame, it being noted that in a finishing operation the pressure of the grinding wheel is very light. The tension of the springs is adjustable to give the proper degree of pressure on the shoe.

Figure 2:
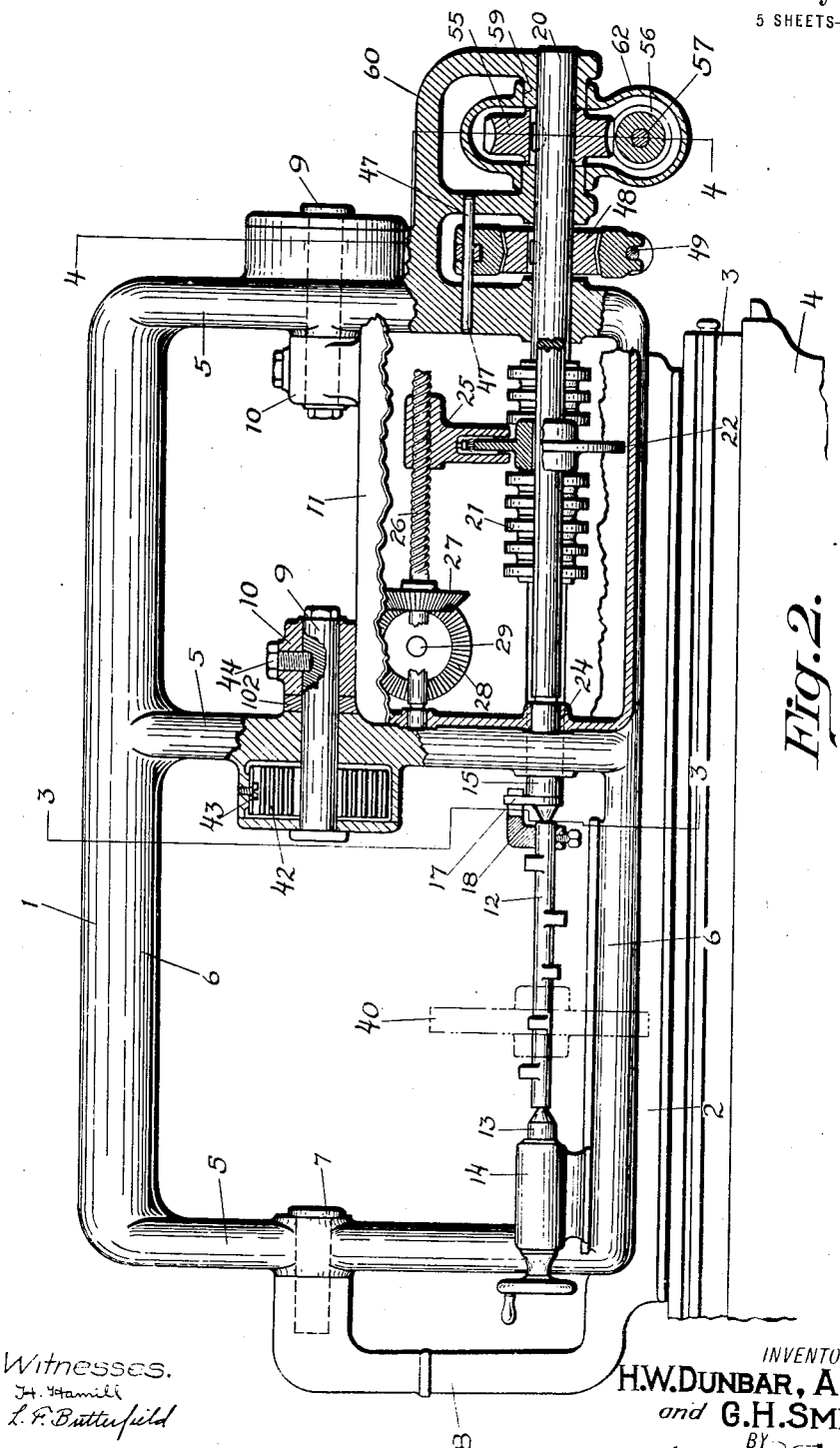
Fig. 2 is a front elevation, partly broken away, of our swinging frame attached to the swivel table for mounting on a grinding machine.
Figure 3:
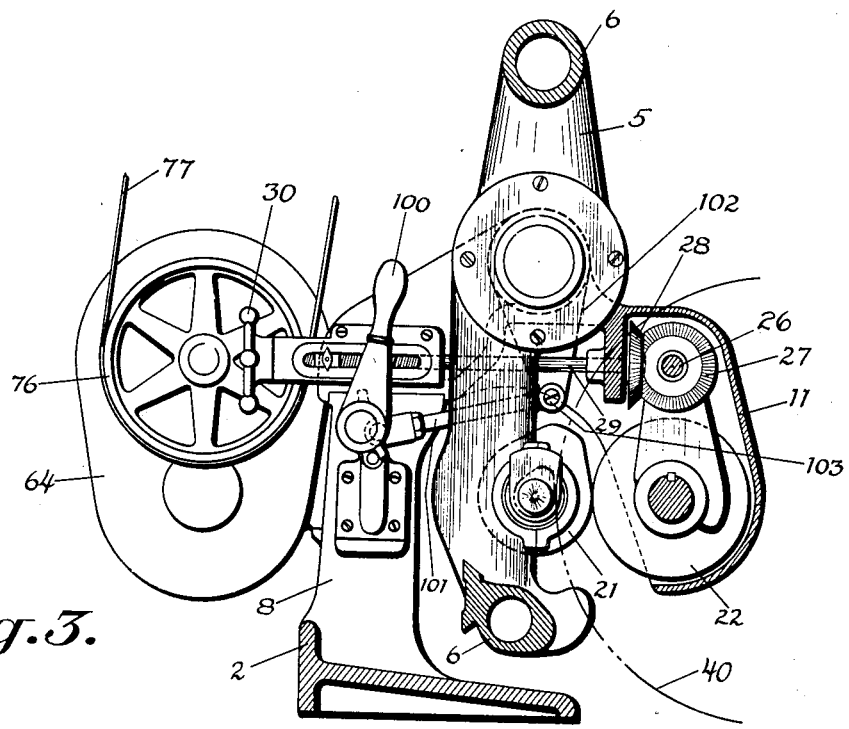
Fig. 3 is a section on the line 3—3 of Fig. 2, looking in the direction of the arrows.

To take up back lash in the driving mechanism, which will be presently described, and to prevent the rocking frame jumping or moving irregularly, due to the peculiar shape of the master cam, we provide any suitable retarding means such as the brake illustrated in Figs. 2 and 6, comprising yoke arms 45 and 46 having projecting lugs hinged together on the hinge pin 47 which is carried by the frame 1 and thereby prevented from rotation with the spindle shaft 20. The arms 45 and 46 engage the peripheral surface of a drum 48 which is keyed to the shaft 20. An adjustable yielding frictional pressure upon the drum is provided by means of a spring-pressed clamp comprising a pin 49 connected with one of the arms 45 and adjustable relative to the other arm 46 by means of a thumb screw 50 and spring 51.

If special provisions were not made to guard against it there would be variations in speed of the work-holding spindle, due to rocking of the frame, and this would result in excessive grinding on parts of the cam where movement is retarded and other deleterious effects. We accordingly provide a driving mechanism which insures a constant rotation of the parts sufficiently uniform to obviate these disadvantages. To this end we provide a constantly driven shaft mounted on bearings apart from the frame pivots and connect this shaft with the cam spindle or work-holder by a power-transmitting mechanism adapted to permit swinging of the frame. While various means within the scope of our invention may be utilized, we prefer a telescoping shaft having hinged rotative connections with the driving and driven parts.

Figure 4:
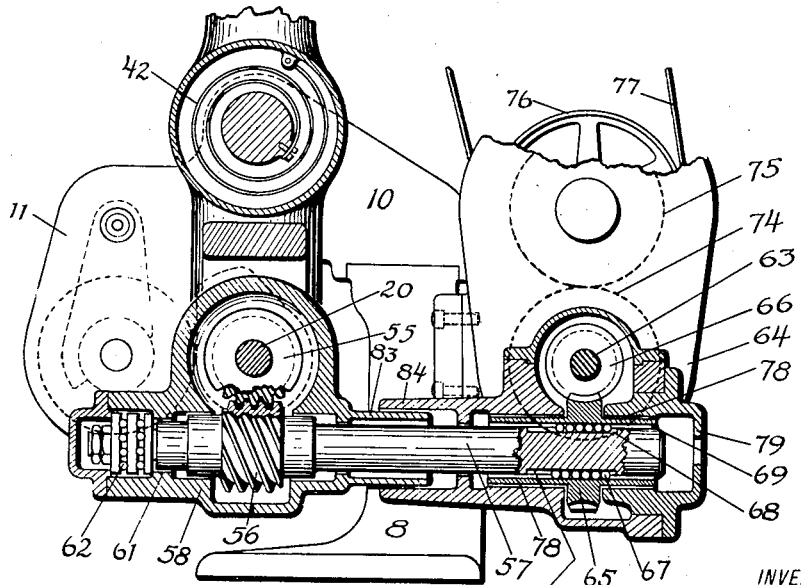
Fig. 4 is a section on the line 4—4 of Fig. 2, looking also in the direction of the arrows.

As a specific embodiment of our invention, reference is had to Figs. 1, 2 and 4 showing what may be termed a telescoping swinging worm and worm wheel drive. This mechanism comprises a worm wheel 55 keyed to the shaft 20 and operatively engaging with a worm 56 fixed on the transverse shaft 57. This shaft 57 is supported to swing about the axis of the worm wheel 55 by a yoke comprising a housing 58 pivotally mounted upon bearings 59 on an arm 60 projecting from the frame 1 to support the shaft 20. The shaft 57 is rotatively mounted in bearings 61 in the housing and prevented from moving longitudinally therein by the thrust ball bearings 62.

The shaft 57 may have rotative power applied thereto by suitable means. In the construction illustrated, the shaft is driven at its opposite end by a fixed driving shaft 63 mounted for rotation in suitable bearing supports 64 on the table 2, shafts 63 and 20 being preferably parallel. The shaft 57 is supported at this end by a yoke similar to the one on the other end, as will be described. A worm wheel 65 on shaft 57 is driven by worm 66 on the driving member 63. To permit swinging of the frame, the shaft 57 must be movable longitudinally relative to the associated driving parts. Accordingly it is made to telescope with one of the driving members and preferably with the worm wheel 65. As illustrated, the worm wheel is slidably keyed to the shaft 57 as by balls 67 running in groove 68 in the shaft 57 and groove 69 in the inner bearing surface of the worm wheel 65. The shaft 63 is rotated by suitable means comprising, for example, a gear 74 on shaft 63, meshing with gear 75 on another shaft parallel therewith, which may be rotated by a pulley 76 and a belt 77 connected with an overhead drive permitting longitudinal movement of the table of the machine.

The hub 78 of the worm wheel 65 is rotatably mounted in bearings in the housings or yoke 79. This housing is suspended to swing about the axis of the shaft 63 by means of suitable bearings 81 and 82, as diagrammatically illustrated in Fig. 1. The housings 58 and 79 have telescoping portions 83 and 84 respectively which may slide relative to each other and keep dirt, oil and other foreign bodies from working into the bearings of the shaft 57 and its associated parts.

Figure 8:
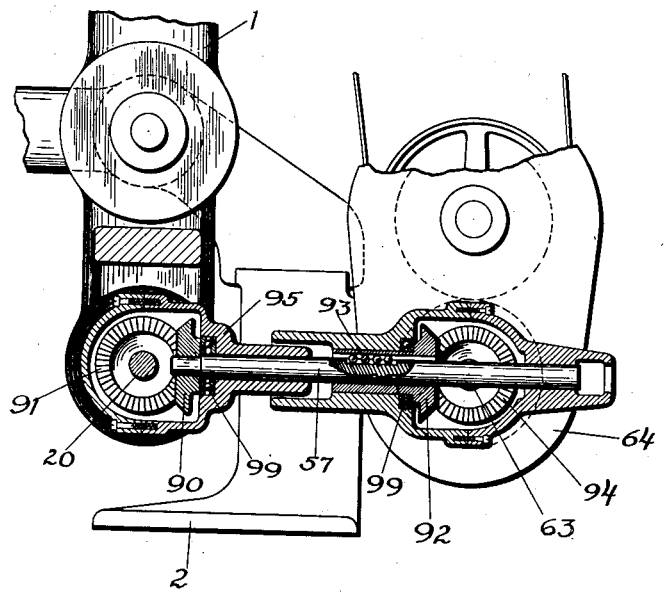
Fig. 8 is a view corresponding with Fig. 4, showing a modified type of driving mechanism.
Figure 9:
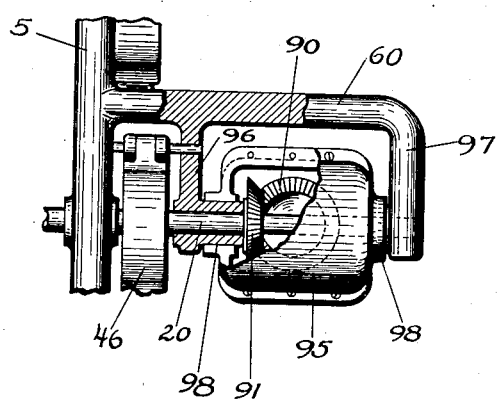
Fig. 9 is another view of this same modification, similar to the lower right hand portion of Fig. 2.

While the driving gearing consists preferably of worm drives, we may utilize other types of mechanism such, for example, as that shown in Figs. 8 and 9 which involves the use of bevel gears. As here shown, the shaft 57 may have a bevel gear 90 on one end meshing with another bevel gear 91 on the shaft 20. At the other end of the shaft is a bevel gear 92 slidably keyed to the shaft, as by means of balls 93 in keyways in the shaft 57 and an extended cylindrical portion of the bevel gear 92. A bevel gear 94 on the driving shaft 63, meshing with gear wheel 92, may be power-driven similarly with the construction described above. In order that the transverse shaft 57 may swing in this type of apparatus, the pairs of bevel gears are mounted in housings or yokes which are pivoted about the centers of the shafts 20 and 63. The housing 95, carrying the bevel gears 90 and 91, is supported on arms 96 and 97 on the arm 60 of the swinging frame 1, suitable bearings 98 being provided to permit rotation of the housing. Thrust ball bearings 99 are suitably provided to take up the longitudinal forces in shaft 57 caused by rotation of the frame.

When a new cam shaft is to be inserted in the work-holding centers it is necessary that the frame be moved away from the grinding wheel. For this purpose we provide a hand lever 100 pivotally mounted on a fixed part of the grinding machine table. A rod 101 is eccentrically pivoted on the hand lever and connected with a further lever 102 rotatably suspended on the pivot pin 9. A pin 103 (see Figs. 1 and 3) projecting from this member 102 engages the central standard of the rocking frame so that when the hand lever 100 is moved forward this pin 103 is caused to move backward and rocks the lower portion of the frame away from the grinding wheel.

As described with reference to Figs. 1 and 7, the master cam roller 22 may be operated manually. We, however, find it expedient, in certain types of grinding machines which may be used continuously for grinding one type of work, to move the master cam roller automatically corresponding with the position of the table on the grinding machine. To this end we may connect a gear mechanism with the bevel gear 28, which in turn is operated by a rack and pinion, the rack 110 being adjustably fixed on the machine base 4. A pinion 111 coöperating with the rack is mounted on a shaft 112 fixed to the casing 11. A bevel gear 113 on the shaft 112, coöperating with a further gear 114 on the shaft 26, transmits motion to the cam roller adjusting yoke 25. The bevel gear wheel 111 is made of such a size as compared with the other gear parts that the master cam roller 22 may be moved the correct distance from one master cam to the next one as the work being ground is moved across the space between two adjacent cams. The relative sizes of these gear wheels of course determine the longitudinal movement of the cam roller 22, this having to be fixed for a given spacing of the cams on the work cam shaft.

In order that there may be different spacings between cams being ground, we may change the pinion 111 for another one of a different size. To permit using different sized pinions, the rack bar 110 is made adjustable on its base, being fastened thereto by means of bolts 116 screwed into the base through elongated slots 117 in the rack bar. Since it is desirable to traverse the work relative to the grinding wheel as grinding proceeds, we provide a lost motion connection sufficient for this purpose in the gearing and preferably between the gear wheel 111 and its shaft 112. This is accomplished by providing the wheel 111 with keys 118 and making the key-slots 119 in the shaft as wide as necessary. By this means the shaft is permitted to turn freely a desired distance as the table is rocked back and forth, without disturbing the position of the cam roller.

The operation of the device is obvious from the above disclosure. To grind the cams on a cam shaft, patterns or master cams are correctly mounted on shaft 20 according to the work to be done, and, if the pattern adjustment is to be made automatically, pinion 111 and the rack 110 are adjusted to correspond with the spacings between the cams to be ground. The frame 1 is swung back by movement of hand lever 100 and the work 12 inserted and adjusted to a grinding position adjacent the wheel 40. When power is applied to the driving shaft 63, rotative motion is transmitted through the gearing and transverse shaft 57 to the master cam shaft 20, which in turn drives the work. As the master contacting with the roller 22 rotates, it rocks the work axis back and forth away from the grinding wheel and so forms the cam corresponding with the pattern, the springs 42 and the drum brake preserving a steady motion. When the table is moved longitudinally to position a second cam opposite the wheel, the cam roller 22 must also be located against the master corresponding in position and shape with the new cam to be ground. This may be accomplished manually by moving the yoke 25 by means of the hand adjustment device and the correct position predetermined by means of the pointer and scale. If a large number of duplicate shafts are to be ground, the automatic arrangement shown in Figs. 10 to 14 is utilized, in which case movement of the rack 110 on the table rotates pinion 111 and this in turn drives the screw 26 and moves the roller 22.

We have accordingly provided a cam-grinding mechanism which permits rapid and accurate grinding of cams, which may be easily run and manually adjusted by an operator from a single position in front of the machine and in which the work may be moved to locate any cam in front of the grinding wheel, and without thought on the part of the operator, the master cam roller is thereby automatically and correctly positioned adjacent the proper master cam. By this construction work of a duplicate nature may be rapidly turned out, as for example in producing cam shafts for a single type of automobile engine, since after the machine has been set up and the proper masters correctly located and a wheel 111 of the correct size selected, but little of mechanical skill is required to run the machine and replace the work.

Furthermore, by means of our construction we are enabled to rotate the work-holder and the master cams not only constantly but also synchronously and simultaneously, due to the form of driving connection between the driving shaft, the cam shaft and the work. In other types involving a geared connection between the parts, back lash tends to prevent starting and rotating them together, so that the work being ground does not correspond with the pattern. In our device the connection between the master cam shaft 20 and the work-holder, comprising the spindle 15, is rigid or so made that the parts must rotate together, this being accomplished either by making the parts integral or by so connecting them that no relative motion between them can be had. Hence, when the work has been correctly positioned and the driving dog connections properly made, the work and the master cams must rotate together and the rotative relation of these parts cannot be affected during operation of the machine. By utilizing this type of driving connection between the parts we are enabled to have our driver and its supports separate and distinct from the pivotal supports of the frame and thus avoid the necessity of mounting gears on a frame pivot support and driving the work through one gear rolling on the periphery of another. In this way we avoid using a construction which permits the work rotation to be accelerated or retarded or even stopped momentarily, and we provide a device in which the work may be rotated continuously and at a rate sufficiently uniform to prevent detrimental effects on the grinding operation.

We furthermore insure a smooth operation of the apparatus by attention to various details of construction such, for example, as are involved in using a rotating cam shoe to reduce the wear and in providing a frictionless keying device involving the ball bearing key-way and balls to permit telescoping of the transverse shaft and its associated parts. By making the tension of the springs 42 adjustable and locating the springs on the standards between which the master cam shaft is mounted, we prevent warping of the frame due to the pressure of the master cam on the shoe, it being noted that the grinding wheel presses but slightly against the work during a finishing operation. To insure making the cam according to design, we make the master cam in the same machine by reversing the arrangement of grinding wheel and rotating shoe but keeping to the same radial dimensions for the rotating parts contacting with the cams and the master cams respectively.

By means of these and other improvements in cam-grinding apparatus, as are disclosed herein, we have provided an attachment for grinding machines which will grind cams or other similar irregular forms and finish them accurately and precisely in accordance with the original models.

Having thus described our invention, what we claim as new and desire to secure by Letters Patent is:

1. In a grinding machine, a grinding wheel, a rotatable work support mounted for swinging movement in the arc of a circle, a driving member rotatably mounted on fixed supports parallel with the axis of said work support and means for operatively transmitting a continuous rotative motion from the driving member to said support while said parts are swinging relative to each other and preventing detrimental retardation or acceleration of the rotation of the work.

2. In a grinding machine, a swinging frame, a rotatable work support thereon adapted to swing parallel with its axis, a fixed support, a driving member rotatably mounted thereon, a transverse shaft having direct operative driving connections with the driving member and work support and means permitting the frame to swing while the mechanism is being driven without causing detrimental variation of the work speed.

3. In a grinding machine, a fixedly mounted, rotatable driving shaft, a frame mounted on the grinding machine to swing toward and away from said shaft, two members comprising a work-holding device and a pattern shaft rotatively mounted on the frame in axial alinement but out of line with the frame pivots, a driving connection therebetween and direct driving connections from said driving shaft to one of said members for rotating the same continuously as the frame swings.

4. In a grinding machine, a rotatable shaft mounted for swinging movement in the arc of a circle, a driving shaft rotatively mounted on fixed supports parallel with the axis of the swinging shaft, a transverse shaft having direct driving connections with the swinging shaft, a support permitting movement of one end of the transverse shaft about the rotative axis of the swinging shaft and means whereby said transverse shaft may transmit rotative power during swinging movement of the driven shaft.

5. In a cam-grinding attachment, a swinging frame, a shaft thereon rotatably mounted out of line with the frame pivots, a rotatable driving shaft on fixed supports parallel with the other shaft, two yokes pivotally mounted relative to the axes of the shafts, a slidable shaft carried by the yokes and means including gearing on said shafts for transmitting motion from the driving shaft to the shaft on the frame as the latter swings and the slidable shaft moves relative to the frame.

6. In a machine comprising two parallel, rotatable shafts, one of which is mounted on a frame to swing transversely on the arc of a circle, a yoke mounted to rotate about the axis of each shaft, a transverse shaft supported by the two yokes and worm-driving connections between the ends of the transverse shaft and the other shafts, said transverse shaft being slidable relative to one of the worm-driving members to permit swinging motion of the frame.

7. In a grinding machine, the combination of a swinging frame, work-supporting members and a master cam shaft axially alined thereon but not in line with the frame pivots, a power-driven shaft supported on a non-swinging portion of the mechanism and a hinged, telescoping worm and worm wheel connection between said driven shaft and the cam and work shafts adapted to rotate the latter as the frame swings.

8. In a grinding machine, two parallel rotatable shafts, a rigid support for one, a pivotal support for the other permitting a transverse swinging movement thereof, a worm on the fixed shaft, a worm wheel on the other, a transverse shaft having worm wheel and worm-driving members meshing with the coöperating parts on the parallel shafts, said transverse shaft being keyed to one of its driving members for sliding movement therethrough, and means supporting the transverse shaft for pivotal movement about the axes of the parallel shafts as they move relative to each other.

9. In a cam-grinding machine, comprising a swinging frame and a driven shaft mounted thereon for swinging about the axis of the frame, a rotatable driving shaft rigidly mounted parallel with the driven shaft, a yoke pivotally carried by each shaft, a rotatable transverse shaft suspended on said yokes for swinging movement, gear members on the three shafts for transmitting rotative motion, a keyed connection between the transverse shaft and a gear member permitting sliding of the shaft as the frame swings and telescoping parts on the transverse shaft connected with said yokes for excluding dust therefrom.

10. In a grinding machine, a relatively movable table and grinding wheel, work supports on the table, means, including a plurality of rotatable patterns and a shoe engaged by one of the patterns, to grind the work to correspond with a pattern and automatic means to shift the shoe and patterns relative to each other by relative movement of the work-supporting table and the grinding wheel.

11. In a grinding machine, a base, a grinding wheel, a table on the base movable longitudinally past the wheel, a swinging frame mounted on the table, work supports and patterns mounted on the table to rotate synchronously, a shoe adjustably supported on the machine base in contact with a pattern, means to rotate the pattern and swing the frame to grind the work corresponding with the pattern and means automatically operated by movement of the table in locating the work relative to the wheel to shift the shoe and the patterns relative to each other.

12. In a grinding machine, a grinding wheel and table longitudinally movable relative to each other, work supports and a plurality of patterns rotatably mounted on the table, a shoe adjustably engaging a pattern, manually operable means for adjusting the position of the shoe relative to the pattern and automatically operated means for making such adjustment by relative movement of the table and grinding wheel.

13. In combination with a longitudinally movable grinding machine table, a swinging frame mounted thereon, a work-supporting shaft and rotatable master cams in axial alinement mounted on the frame, means to rotate the cams as the frame swings, a shoe adjustably mounted on the table for movement parallel with the master cam shaft and adapted to swing the frame as a master cam rotates against it, means for adjusting the position of the shoe manually and means for moving the shoe automatically by movement of the table.

14. In a grinding machine, a relatively movable table and grinding wheel, work supports on the table, means, including a plurality of rotatable patterns and a shoe engaged by one of the patterns, to grind the work to correspond with a pattern and means permitting relative traverse of the work across the face of the grinding wheel without changing the position of the shoe relative to the patterns.

15. In a cam-grinding attachment for a grinding machine, the combination of a base, a slidable table thereon, a grinding wheel, a frame pivotally suspended on the table, devices to hold and rotate work against the wheel for cam grinding and a shaft rotatively supported on the frame, master cams on said shaft, means to rotate the shaft and work synchronously, a fixed support on the table, a rotatable master cam shoe longitudinally movably mounted thereon to engage a master cam and swing the frame as the master cam rotates and automatic means to adjust the shoe to a position adjacent a master cam by longitudinal movement of the table.

16. A cam-grinding attachment for a grinding machine comprising a table, supports thereon, a frame pivotally suspended therefrom, work-holding devices and a pattern shaft mounted in axial alinement in the frame, cam patterns removably located on the pattern shaft, a fixed support, a cam pattern roller rotatively mounted thereon to contact with a pattern and swing the frame as the latter rotates and precision means, including an index and scale, to move said roller to a predetermined position opposite any desired pattern.

17. In combination with the base, the longitudinally movable table and the grinding wheel of a grinding machine, a cam-grinding attachment comprising a swinging frame mounted on the table, a shaft and master cams thereon rotatively mounted on the frame for swinging movement, devices for holding work on the frame for grinding spaced cams thereon, means to rotate the master cam shaft and the work in unison, a shoe adjustably supported on the machine to contact with a master cam and swing the frame as the cam rotates, a rack bar on the base, a pinion rotatively mounted on the table in mesh with the rack bar and precision means operated by rotation of the pinion to move the shoe adjacent to the proper master cam when the table is moved to position a new portion of the work adjacent the grinding wheel for grinding a new cam corresponding with the selected master.

18. In a grinding machine, a grinding wheel, a longitudinally movable table, work supports thereon, means, including a plurality of rotatable patterns and a shoe engaged by one of the patterns, to grind the work to correspond with a pattern, a rack bar on the grinding machine, a pinion rotatably mounted on the table engaging the rack bar, connections between the pinion and the shoe to move the shoe automatically as the table is moved, and a lost motion device in said connections permitting traversing the work across the wheel face without moving the shoe.

19. In a cam-grinding machine, the combination of a table, three supports thereon, a swinging frame comprising three standards having pivots mounted on the supports, work-holding centers and a shaft carrying master cams axially alined on the frame, a fixed shaft on the table and a master cam roller axially movable thereon in front of the master cams, a spiral spring connected to a standard and its support for holding the cams against the roller, a spring-tensioned brake coöperating with a drum on the master cam shaft to steady the rotation thereof and means to rotate the master cams and work while the frame swings.

20. A cam-grinding attachment for grinding machines comprising a swinging frame comprising three standards mounted on the table of the machine, devices including a driving member to support a cam shaft to be ground between an outer and the middle standard, a pattern shaft mounted between the other outer and the middle standard in axial alinement with the cam shaft axis, a coupling between the driving member and the pattern shaft for synchronous rotation of the two and means for rotating the pattern shaft and work continuously and preventing detrimental retardation of the work relative to the grinding wheel as the frame swings.

21. In a grinding machine, a support, a swinging frame pivoted thereon, a rotatable work-holder thereon adapted to swing parallel with its axis, a master cam shaft, master cams thereon, a rigid driving connection between said shaft and the work-holder adapting these parts to rotate synchronously and simultaneously, a rotatable driving member, a fixed support therefor separate from the frame pivots, and means operatively connecting said driving member with the work-holder and master cam shaft to rotate the latter continuously as the frame swings.

22. In a grinding machine, a support, a swinging frame pivoted thereon, a rotatable work-holder thereon adapted to swing parallel with its axis, a master cam shaft, master cams thereon, a rigid driving connection between said shaft and the work-holder adapting these parts to rotate synchronously and simultaneously, a rotatable driving member, a fixed support therefor separate from the frame pivots, and a double hinged telescoping connection between said driving member and the work-holder and master cam shaft to rotate the latter constantly as the frame swings.

23. A cam-grinding attachment for a grinding machine comprising a support, a frame pivotally mounted thereon, a work-holding device and a master cam shaft mounted in axial alinement on the frame to swing transversely in the arc of a circle, a connection between said device and shaft adapted to cause the parts to rotate synchronously and simultaneously, master cams on the shaft, a master cam shoe engaging a master cam, fixed supports for the shoe, means to hold the frame in a forward position with a cam against the shoe, whereby rotation of the master cam causes the frame to swing, a rotatable driving member, fixed supports therefor, and a telescoping hinged connection between said driving member and the work-holding device and master cam shaft to rotate the latter constantly as the frame swings.

24. In a cam-grinding device, a swinging frame, pivot supports therefor, a shaft rotatably mounted on the frame to swing transversely, a fixed support, a driving shaft rotatably mounted thereon, a transverse shaft, yokes pivotally supporting the ends of the transverse shaft to swing about the centers of the shaft on the frame and the driving shaft, means on said shafts to transmit rotative motion, said transverse shaft comprising telescoping parts, and a frictionless keying device for said parts, whereby the shaft on the frame may be rotated as it swings.

25. In a cam-grinding apparatus, a base, a swinging frame, pivotal supports therefor, a work-holder and a master cam shaft rotatably mounted thereon to swing transversely, a master cam on said shaft, means to rotate said shafts synchronously and simultaneously, a master cam shoe mounted on the base and adapted to be engaged by the master cam and cause the frame to swing as the cam rotates, yielding means to hold the frame forward with the master cam in firm contact with the shoe and means to adjust the pressure between said parts.

26. In a cam-grinding apparatus, a base, a swinging frame comprising a plurality of standards, a plurality of pivotal supports therefor mounted on the base, a master cam shaft rotatably mounted between two of said standards, a master cam thereon, means to rotate the shaft as the frame swings, a master cam shoe mounted on the base and adapted to be engaged by said cam, springs engaging the two said standards and their supports to press the frame forward yieldingly with the cam engaging the shoe and means to adjust the tension of the springs.

Signed at Worcester, Massachusetts, this 11th day of July, 1918.

HOWARD W. DUNBAR.
ALBERT TURNER.
GEORGE H. SMITH.